United States Patent [19]

Yoshida

[11] 4,322,788
[45] Mar. 30, 1982

[54] INVERTER CIRCUIT

[75] Inventor: Tadao Yoshida, Tokyo, Japan

[73] Assignee: Sony Corporation, Tokyo, Japan

[21] Appl. No.: 147,579

[22] Filed: May 8, 1980

[30] Foreign Application Priority Data

May 10, 1979 [JP] Japan .................................. 54-57372

[51] Int. Cl.³ .......................................... H02M 3/335
[52] U.S. Cl. ........................................ 363/49; 363/22; 363/133
[58] Field of Search ................................... 363/22–25, 363/49, 97, 98, 133; 331/113 R, 113 A, 114

[56] References Cited

U.S. PATENT DOCUMENTS

| | | | |
|---|---|---|---|
| 3,408,553 | 10/1968 | Bishop | 363/97 |
| 3,660,749 | 5/1972 | Kadri | 363/23 |
| 4,012,683 | 3/1977 | Ferro et al. | 363/49 X |
| 4,047,089 | 9/1977 | Suzuki et al. | 363/49 |

*Primary Examiner*—William M. Shoop
*Assistant Examiner*—Peter S. Wong

*Attorney, Agent, or Firm*—Hill, Van Santen, Steadman, Chiara & Simpson

[57] ABSTRACT

A control circuit for an inverter includes a DC voltage source having first and second terminals, an input transformer having a primary winding, a pair of secondary windings and a magnetic core, an output transformer having a primary winding, a secondary winding and a feedback winding, first and second transistors each having a control electrode, the main current paths of which are connected, through the primary winding of the output transformer, between the first and second terminals of the DC voltage source and the control electrodes of which are connected to the pair of secondary windings of the input transformer, coupling circuit for connecting the primary winding of the input transformer to the feedback winding of the output transformer, a starting circuit for putting one of the first and second transistors in its conductive state when the DC voltage source is operated, and a control circuit including at least a shorting winding provided in connection with the magnetic core of the input transformer so as to cut off the first and second transistors during OFF operation of the DC voltage source.

7 Claims, 3 Drawing Figures

INVERTER CIRCUIT

BACKGROUND OF THE INVENTION

1. Field of the Invention

The present invention relates generally to a control circuit for an inverter, and is directed more particularly to a control circuit for an inverter in which a switch with large capacitance provided between a DC voltage source and a transistor for forming the inverter in the prior art can be omitted.

2. Description of the Prior Art

In the art, when an inverter is made ON and OFF, a relay switch is connected to a series circuit consisting of a DC voltage source and a transistor for forming the inverter and is made ON and OFF in accordance with the operation of the DC voltage source. When a load to the inverter is large, the relay must have large capacity. In this case, electric power consumed in the relay increases exceeding a negligible value, so that the efficiency is lowered. Further, the prior art control circuit for the inverter is expensive.

In the case of an ordinary self-excited inverter, a starting circuit using a transistor is required. Therefore, it is desired that a control circuit for making the inverter OFF is not so complicated in construction. In the art, a control circuit for an inverter simple in construction and low in price is not proposed.

OBJECTS AND SUMMARY OF THE INVENTION

Accordingly, an object of the present invention is to provide a control circuit for an inverter free of the defects encountered in the prior art.

Another object of the invention is to provide a control circuit for an inverter which uses a short-circuiting winding to stop the operation of the inverter.

In accordance with an aspect of the present invention, a control circuit for an inverter is provided, which includes a DC voltage source having first and second terminals, an input transformer having a primary winding, a pair of secondary windings and a magnetic core, an output transformer having a primary winding, a secondary winding and a feedback winding, first and second transistors each having a control electrode, the main current paths of which are connected, through the primary winding of the output transformer, between the first and second terminals of the DC voltage source and the control electrodes of which are connected to the pair of secondary windings of the input transformer, coupling circuit for connecting the primary winding of the input transformer to the feedback winding of the output transformer, a starting circuit for putting one of the first and second transistors in its conductive state when the DC voltage source is operated, and a control circuit at least including a shorting winding provided in connection with the magnetic core of the input transformer so as to cut off the first and second transistors during OFF operation of the DC voltage source.

The other objects, features and advantages of the present invention will become apparent from the following description taken in conjunction with the accompanying drawings through which the like references designate the same elements and parts.

DESCRIPTION OF THE PREFERRED EMBODIMENTS

Before describing the present invention, a prior art control circuit for an inverter will be described with reference to FIG. 1 which shows a prior art control circuit for an inverter for use with a car stereo which utilizes a DC voltage from the battery provided in a car and the power from which is made ON and OFF by a control signal from the outside.

Figure 1:
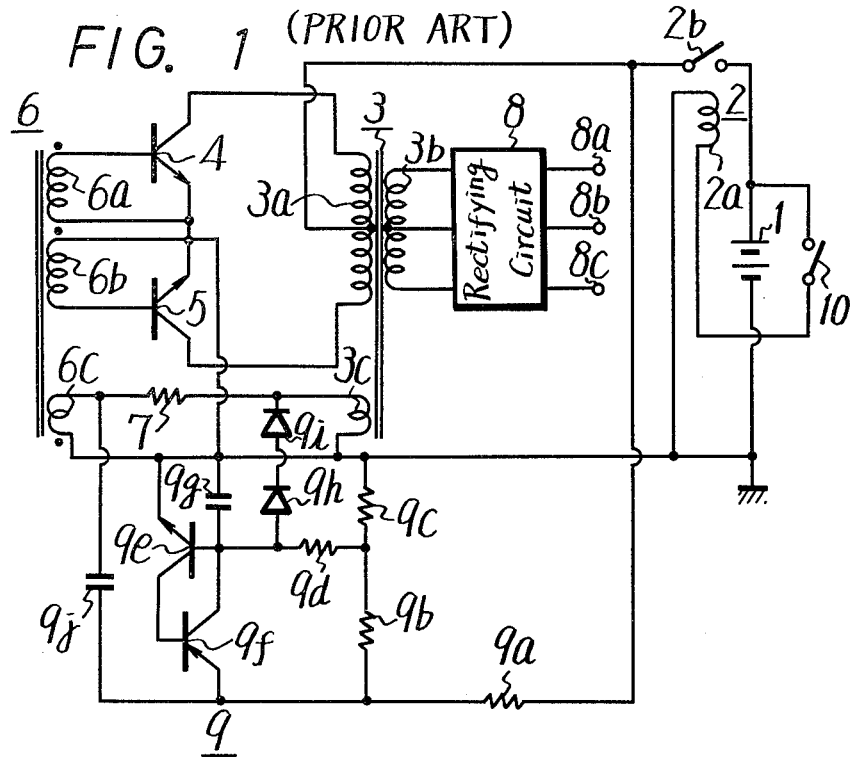
FIG. 1 is a circuit diagram showing a prior art control circuit for an inverter.

In FIG. 1, 1 designates a battery of a car (not shown) whose positive electrode is connected through a relay switch 2b of a relay device 2, which will be described later, to a mid point of a primary winding 3a of an output transformer 3. One end of primary winding 3a is connected to the collector of an NPN type transistor 4 serving as a switching element and the other end of primary winding 3a is connected to the collector of another NPN type transistor 5 serving as a switching element whose emitter is connected to the emitter of transistor 4. The connection points of the emitters of transistors 4 and 5 is connected to the negative electrode of battery 1. This negative electrode of battery 1 is in turn grounded. An input transformer 6 is provided whose control windings 6a and 6b are connected between the bases and emitters of transistors 4 and 5, respectively, in such a manner that the winding direction of control windings 6a and 6b are selected reverse with each other. The output transformer 3 has a feedback winding 3c whose one end is connected through a resistor 7 to one end of a voltage feedback winding 6c of input transformer 6, and the other ends of respective feedback windings 3c and 6c are connected together to the ground. The AC voltage induced across a secondary winding 3b of output transformer 3 is supplied to a rectifying circuit 8 which produces a DC voltage with a predetermined positive value between its output terminals 8a and 8b and a DC voltage with a predetermined negative value between its output terminals 8c and 8b.

The connection point between the relay switch 2b and the primary winding 3a of output transformer 3 is grounded through a series circuit consisting of three resistors 9a, 9b and 9c which form a part of a starting or starter circuit 9. The connection point between the resistors 9b and 9c is connected through a resistor 9d to the base of an NPN type transistor 9e, and the connection point between the resistors 9a and 9b is connected to the emitter of a PNP type transistor 9f whose base is connected to the collector of transistor 9e and whose collector is connected to the base of transistor 9e. The base of transistor 9e is in turn grounded through a capacitor 9g and is also connected through a series connection of two diodes 9h and 9i to one end of feedback winding 3c of output transformer 3. The emitter of transistor 9f is connected through a capacitor 9j to one end of voltage feedback winding 6c of input transformer 6. The positive electrode of battery 1 is grounded through a series connection of a switch 10, which is made On when, though not shown, for example, a cassette tape is loaded into a car stereo at its predetermined position, and a relay winding 2a of relay device 2.

The operation of the above prior art circuit will be now described. When the cassette tape is loaded to the car stereo, the switch 10 is made ON and the output voltage from the battery 1 is applied to the relay winding 2a. Thus, the relay switch 2b is made ON. Accordingly, the output voltage from the battery 1 is applied through the relay switch 2b and resistor 9a to the capacitor 9j of starter circuit 9 and hence the capacitor 9j is charged up to a predetermined voltage. While, the output voltage from the battery 1 is divided by the resistors 9b and 9c and then applied through the resistor 9d to the capacitor 9g to charge it. Thus, the base voltage of transistor 9e in the starter circuit 9 increases gradually in response to the time constant determined by the resistor 9d and capacitor 9g, so that the transistor 9e is made ON after a predetermined time from the time when the relay switch 2b becomes ON. When the transistor 9e becomes ON, the base-emitter of transistor 9f is forwardly biased and hence the transistor 9f turns ON. Accordingly, the charge in the capacitor 9j is discharged through the transistors 9f, 9e and voltage feedback winding 6c to generate a start pulse across the voltage feedback winding 6c. Thus, one of switching transistors 4 and 5 is made ON by the start pulse, so that the inverter consisting of transistors 4, 5 and transformers 3, 6 starts its operation.

After the inverter is started, the switching transistors 4 and 5 become ON and OFF alternately. Thus, a pulse signal is generated across the secondary winding 3b of output transformer 3, and accordingly a positive DC voltage and a negative DC voltage are produced between output terminals 8a and 8b and between 8c and 8b of rectifying circuit 8, respectively. In this case, after the inverter is started, the base of transistor 9e is supplied with the pulse signal from the feedback winding 3c through the diodes 9i and 9h as a reverse bias, so that both the transistors 9e and 9f become OFF. Accordingly, the power consumed in the starter circuit is reduced by that much.

When the cassette tape is withdrawn from the car stereo, the switch 10 is made OFF. As a result, the relay winding 2a is de-energized and hence the relay switch 2b turns OFF. Thus, the inverter circuit becomes inoperative.

With the above prior art inverter circuit, the relay device 2 is employed to make the power source ON and OFF, so that the power is additionally consumed in the relay device 2. When the normalized power of the inverter circuit increases, a relay device large in size so much becomes necessary with the result that the relay device consumes much power and the circuit becomes expensive.

The present invention free from the above prior art defect will be hereinafter described with reference to the attached drawings.

Figure 2:
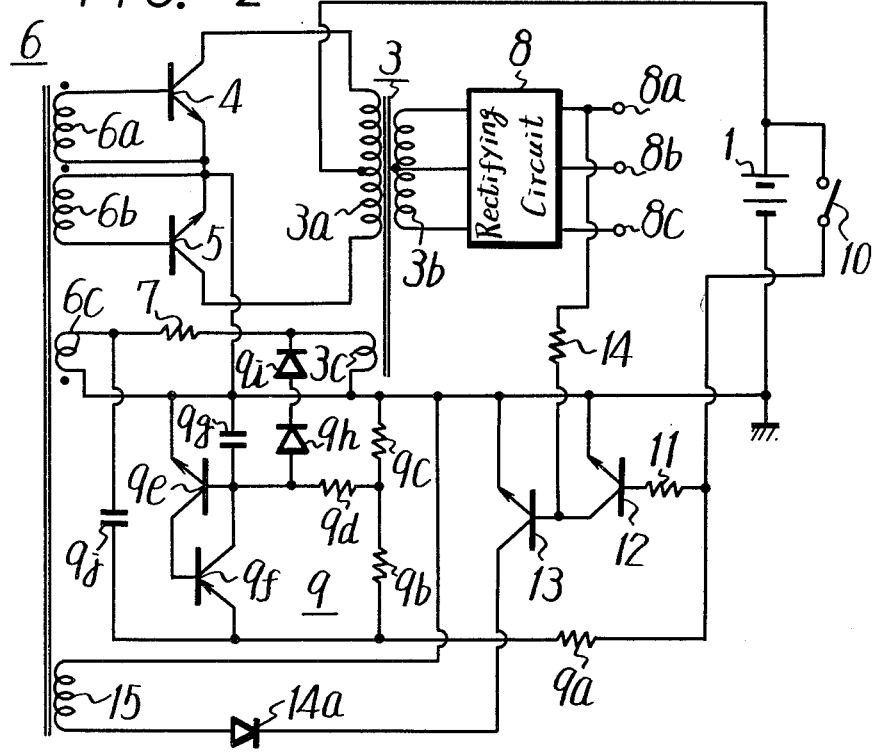
FIG. 2 is a circuit diagram showing an example of the control circuit for an inverter according to the present invention.

FIG. 2 shows an example of the control circuit for an inverter according to the present invention in which the parts and elements corresponding to those of FIG. 1 are marked with the same references and their description will be omitted for the sake of brevity.

In the example of the invention shown in FIG. 2, the positive electrode of battery 1 is connected to the mid point of primary winding 3a of output transformer 3 and also to the ground through the series connection consisting of switch 10, which is made ON when a cassette tape is loaded into a car stereo at its predetermined position, resistors 9a, 9b and 9c. The connection point between the switch 10 and resistor 9a is connected through a resistor 11 to the base of an NPN type transistor 12 whose emitter is grounded and whose collector is connected to the base of an NPN type transistor 13 and also to the output terminal 8a of rectifying circuit 8 through a resistor 14 with relatively high resistance value. The transistor 13 has the emitter connected to the ground and the collector connected to the cathode of a reverse current blocking diode 14a whose anode is grounded through a winding 15 wound on the input transformer 6 for short-circuit. In this case, the number of turns of winding 15 is selected relatively large as compared with those of control windings 6a and 6b. The other circuit construction of the example shown in FIG. 2 is substantially same as that of the prior art shown in FIG. 1.

Now, the operation of the example according to the invention shown in FIG. 2 will be described. When a cassette tape is loaded to the car stereo provided with the control circuit for an inverter shown in FIG. 2 at a predetermined position of the car stereo and the stereo sound reproduced thereby is to be listened, the insertion of the cassette tape is detected and the switch 10 is closed. Then, the control signal i.e. DC voltage from the battery 1 is applied to the series connection of resistors 9a, 9b and 9c and the capacitor 9j is charged by the voltage from the battery 1 through the resistor 9a. At the same time, similar to the example of FIG. 1, the transistors 9e and 9f are operated to supply the start pulse to the voltage feedback winding 6c to thereby make the transistors 4 or 5 in operative state. Thus, the inverter consisting of output transformer 3, transistors 4, 5 and input transformer 6 is started to be in oscillation state. In this case, since the DC voltage from the battery 1 is applied through the resistor 11 to the base of transistor 12, the transistor 12 becomes conductive to make the base potential of transistor 13 same as its emitter potential equal to the ground level. As a result, the transistor 13 becomes non-conductive, so that the short-circuiting winding 15 is opened from the inverter. Therefore, after the inverter is started, its oscillation state is kept with the result that between the output terminals 8a and 8b and between 8c and 8b there respectively appear desired positive and negative DC voltages, and hence the power source for the car stereo can be made operative. Further, when the inverter is made in the oscillation state, since similar to the prior art example of FIG. 1, a base voltage Vb of transistor 9e is applied through the diodes 9h and 9i to one end of feedback winding 3c of output transformer 3, the transistor 9e is reversely biased by the AC voltage generated from the feedback winding 3c. Thus, the starter circuit 9 becomes inoperative.

When the cassette tape is taken out from the predetermined position of the car stereo, the switch 10 turns OFF and hence the control signal i.e. DC voltage from the battery 1 is not applied to the base of transistor 12 with the result that this transistor 12 turns OFF. Accordingly, the positive DC voltage obtained at the output terminal 8a is applied through resistor 14 to the base of transistor 13, so that this transistor 13 turns ON and hence the short-circuiting winding 15 is short-circuited therethrough. Thus, the positive feedback signal from the voltage feedback winding 6c to the control windings 6a and 6b is short-circuited by the short-circuiting winding 15 to thereby stop the oscillation of the inverter. As a result, the positive and negative DC voltages between the output terminals 8a and 8b and between 8c and 8b become no more produced to make the power source for the car stereo OFF.

As described above, according to the present invention, the inverter circuit serving as the DC power source which can be made ON and OFF by the control signal through the switch 10, is provided, in which the prior art relay device 2, which makes the DC voltage supply line from the battery 1 ON and OFF directly, is not used. Therefore, the present invention can reduce the consumed power by such amount corresponding to that consumed in the relay device used in the prior art and hence can be made inexpensive.

Figure 3:
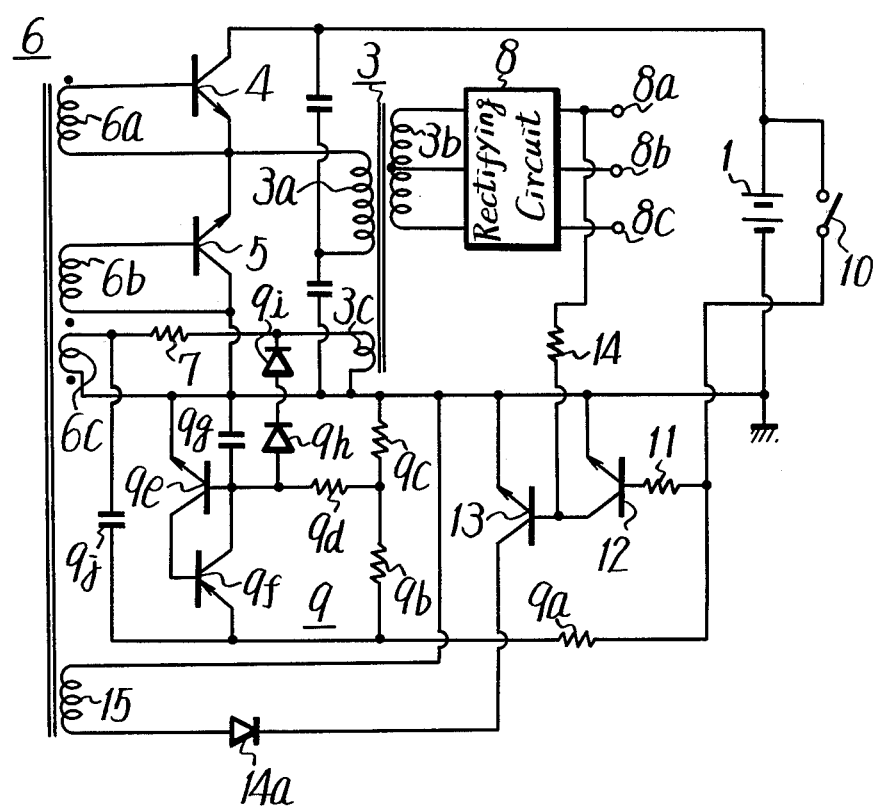
FIG. 3 is a circuit diagram showing another example of the control circuit for an inverter of the invention.

FIG. 3 shows another example of the invention, in which, in place of the inverter in push-pull circuit construction used in the example of the invention shown in FIG. 2, an inverter with a half bridge circuit construction using switching transistors same in polarity is used. In FIG. 3, the parts and elements corresponding to those of FIG. 2 are marked with the same references and their detailed description will be omitted, but it will be easily understood that the example of the invention shown in FIG. 3 achieves the operation and effect same as those achieved by the example of the invention shown in FIG. 2.

In the respective examples of the invention described above, the DC voltage appeared at the output terminal 8a is applied to the base of transistor 13 through the resistor 14, but it may be easily understood that the AC voltage generated across the feedback winding 3c is applied through a rectifying circuit and a resistor instead of the above with the same effect.

It will be apparent that many modifications and variations could be effected by one skilled in the art without departing from the spirits or scope of the novel concepts of the present invention so that the spirits or scope of the invention should be determined by the appended claims only.

I claim as my invention:

1. A control circuit for an inverter comprising:
   (a) a DC voltage source having first and second terminals;
   (b) an input transformer having a primary winding, a pair of secondary winding and a magnetic core;
   (c) an output transformer having a primary winding, a secondary winding and a feedback winding;
   (d) first and second transistors each having a control electrode, the main current paths of which are connected, through the primary winding of said output transformer, between the first and second terminals of said DC voltage source and the control electrodes of which are connected to the pair of secondary windings of said input transformer, respectively;
   (e) circuit means for connecting the primary winding of said input transformer to the feedback winding of said output transformer;
   (f) starting circuit means for putting one of said first and second transistors in its conductive state when said inverter is operated; and
   (g) control circuit means including at least a shorting winding provided in connection with the magnetic core of said input transformer so as to cut off said first and second transistors during OFF operation of said inverter but with said DC voltage source remaining connected to the first and second transistors.

2. A control circuit according to claim 1, in which said control circuit means further includes an ON-OFF switch having a pair of terminals, one of which is connected to the first terminal of said DC voltage source, and switching means connected to said ON-OFF switch to short-circuit said shorting winding during OFF operation of said ON-OFF switch.

3. A control circuit according to claim 2, in which said switching means comprises:
   a third transistor normally conductive during operation of said inverter having a base, emitter and collector, the base of which is connected to said other terminal of said ON-OFF switch and the emitter of which is connected to the second terminal of said DC voltage source, a fourth transistor having a base, emitter and collector, the base of which is connected to the collector of said third transistor, the emitter and collector of which are connected across said shorting winding of said control circuit means; and
   circuit means for supplying a rectified output signal of said secondary winding of said output transformer to the base of said fourth transistor to conduct the same.

4. A control circuit according to claim 3, in which said third and fourth transistors are of the same conductive type.

5. A control circuit according to claim 4, further including a diode connected in the series circuit of said shorting winding, the collector-emitter circuit of said fourth transistor preventing a reverse current therethrough.

6. A control circuit according to claim 5, in which said first and second transistors are of the same conductive type.

7. A control circuit for an inverter comprising:
   (a) a DC voltage source;
   (b) an input transformer having a primary winding, a pair of secondary windings and a magnetic core;
   (c) an output transformer having a primary winding, a secondary winding and a feedback winding;
   (d) first and second transistors each having a control electrode, the main current paths of at least one of which is connected, along with the primary winding of said output transformer, to said DC voltage source and the control electrodes of which are connected to the pair of secondary windings of said input transformer, respectively;
   (e) circuit means for connecting the primary winding of said input transformer to the feedback winding of said output transformer;
   (f) starting circuit means for starting oscillation of the inverter when it is operated;
   (g) an ON-OFF switch connected to the DC voltage source; and
   (h) connected to the ON-OFF switch a control circuit means including at least a shorting winding provided on said input transformer so as to cut off said first and second transistors when the DC voltage source is disconnected by the ON-OFF switch from the control circuit means.

* * * * *